United States Patent [19]

Whitehill et al.

[11] 3,825,227

[45] July 23, 1974

[54] TENSIONING DEVICES

[75] Inventors: Rex G. Whitehill; Gerald D. Berchenbriter, both of Shenandoah, Iowa; Winton D. Jensen, Leawood, Kans.

[73] Assignee: Wickers Corporation, Saginaw, Mich.

[22] Filed: Aug. 16, 1972

[21] Appl. No.: 281,175

[52] U.S. Cl.............. 254/161, 242/125.1, 254/164
[51] Int. Cl............................................. A63b 61/04
[58] Field of Search................... 254/150, 161–165; 242/125, 125.1; 287/49, 51, 58 R

[56] References Cited
UNITED STATES PATENTS

| | | | |
|---|---|---|---|
| 938,563 | 11/1909 | Ferguson | 254/161 |
| 1,775,059 | 9/1930 | Barber | 254/162 |
| 2,451,389 | 10/1948 | Howe | 254/161 |
| 2,519,921 | 8/1950 | Mock | 254/162 |
| 2,563,129 | 8/1951 | Montgomery | 254/163 |
| 3,617,076 | 11/1971 | Attwood et al. | 287/51 |

Primary Examiner—Richard A. Schacher
Assistant Examiner—Jeffrey V. Nase
Attorney, Agent, or Firm—Thomas M. Scofield

[57] ABSTRACT

A device for tensioning cables, straps or like flexible members employed in such applications as the anchoring of mobile homes against wind loads. A wind-up shaft receives the cable or strap and, after tensioning, is held against rotation by a locking plate that is shifted transversely of the shaft to a locking position engaging the shaft within an opening in the plate. For initially attaching the end of the flexible member to the shaft, a retainer thereon provides both eyes for a cable and a slot for receiving a strap in order to accommodate either.

15 Claims, 23 Drawing Figures

PATENTED JUL 23 1974

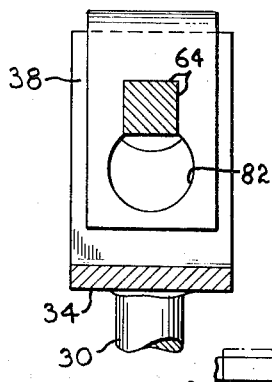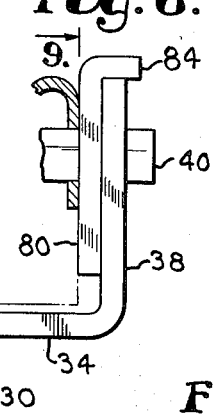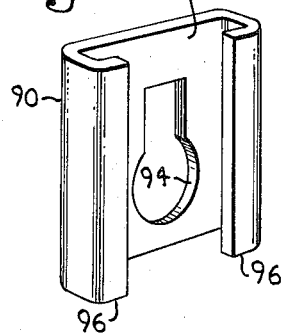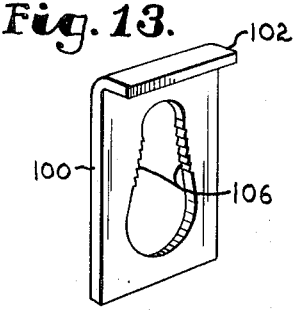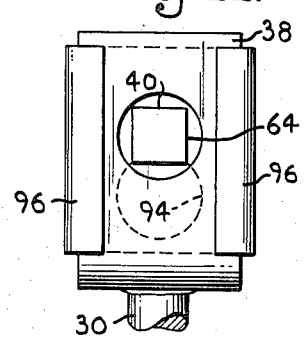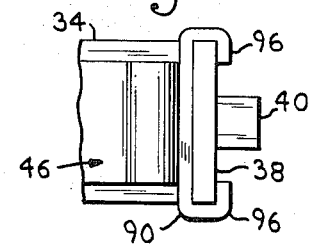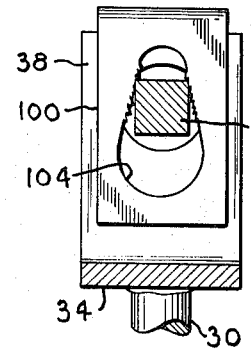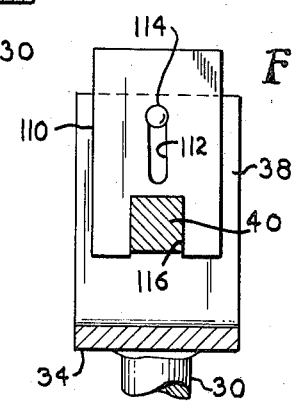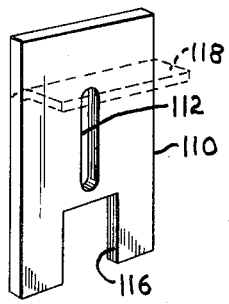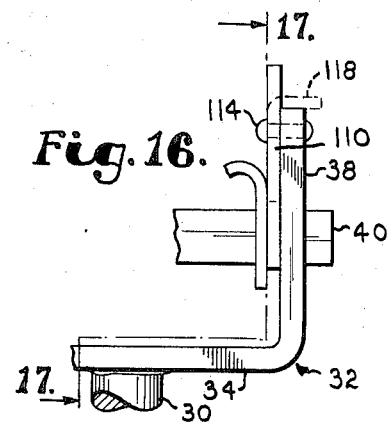

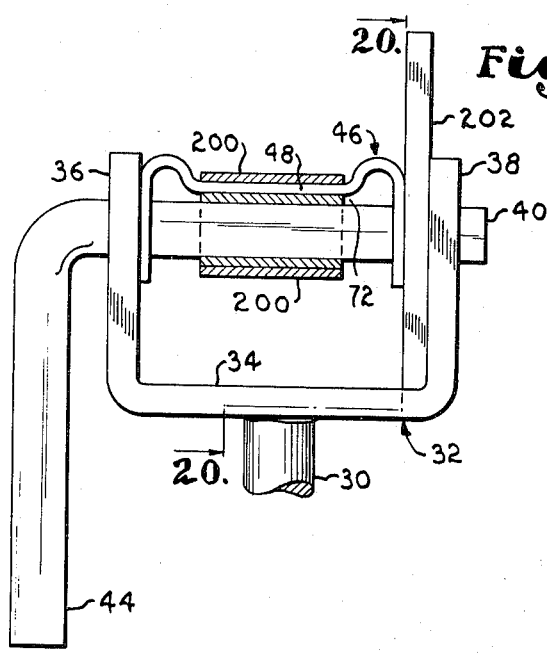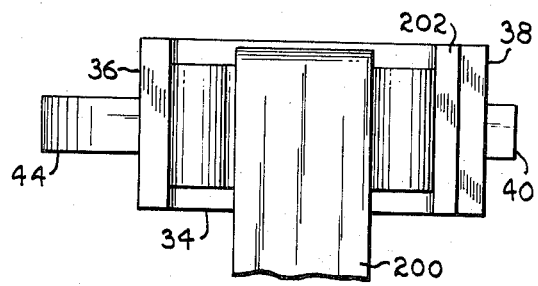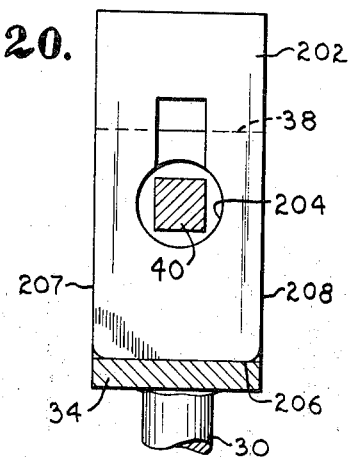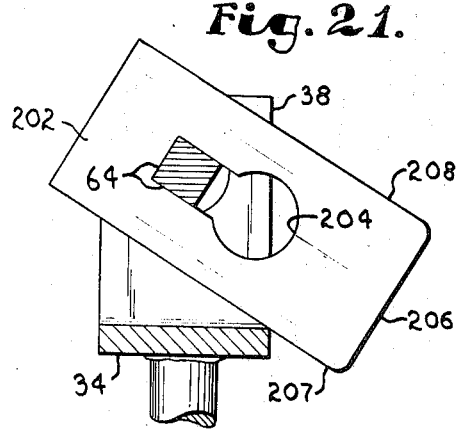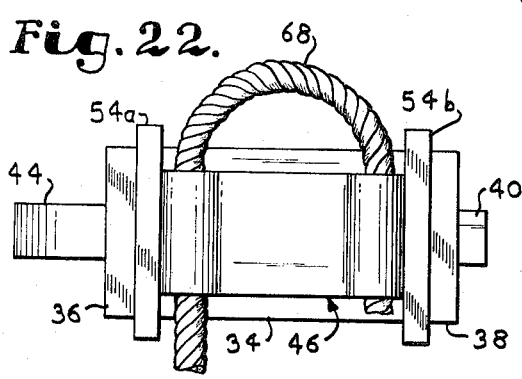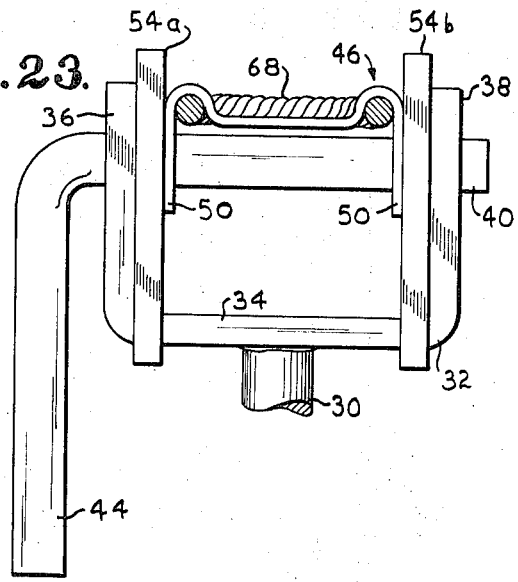

TENSIONING DEVICES

This invention relates to improvements in tensioning devices of the type employed to maintain tension on a cable or strap used to support or guy a structure to which the cable or strap is secured (also ropes, chains, etc.).

Structures such as portable buildings, boat docks and mobile homes are commonly secured by guy wires or cables which must be maintained under tension. A particular example is in the anchoring of mobile homes against wind loads, where it is common practice to install earth anchors in the ground and then connect the anchors to the home by flexible cables or straps. Tensioning devices mounted on the shanks of the anchors may be employed to tighten the cables, in a manner as disclosed in U.S. Pat. No. 3,416,763 to Albert M. Moreno, granted Dec. 17, 1968.

Although the device disclosed in the Moreno patent is useful in the tensioning of cables or straps in mobile home and other applications, the device requires that the take-up bolt (around which the tensioned cable or strap is wound) be shifted longitudinally in order to lock the bolt after the desired tension adjustment is reached. This is accomplished in the Moreno device by rotating a nut on one end of the bolt to draw a square portion of the bolt into a mating opening in the frame of the device. Manifestly, besides requiring special tools and adjustment of the bolt in a precise position to align the interlocking male and female parts, locking the device is time consuming and inherently fails to provide a quick and easy means of readjusting the tension if desired.

It is, therefore, an important object of the present invention to provide a tensioning device similar in its manner of tensioning to the device disclosed in the aforesaid Moreno patent, but wherein threaded members and threaded adjustments are eliminated to facilitate operation of the device and the locking and unlocking thereof.

As a corollary to the foregoing object, it is an important aim of this invention to provide an improved tensioning device as aforesaid employing a lock for its wind-up shaft which may not only be readily operated, but which is also positive and capable of withstanding the high mechanical stress that may be placed thereon by the cable or strap under tension.

Another important object of this invention is to provide an improved tensioning device as aforesaid wherein special tools are normally not required for the operation thereof, and particularly in connection with the operation of the lock that secures the wind-up shaft once the cable or strap has been placed under the desired tension.

Furthermore, it is an important and specific object of this invention to provide a lock for the aforesaid tensioning device employing a locking plate movable transversely of the axis of the wind-up shaft between locked and unlocked positions, wherein a keyhole slot in the locking plate engages flats on the shaft when the plate is in its locked position to thereby hold the shaft against rotation under the force applied thereto by the tensioned cable or strap.

Still further, it is another important and specific object of the invention to provide a lock for the aforesaid tensioning device utilizing a locking plate having a sliding action in directions transverse to the axis of the wind-up shaft between the locked and unlocked positions thereof.

Yet another important and specific object is to provide a sliding locking plate as aforesaid which has an opening therein receiving the wind-up shaft in both the locked and unlocked positions of the plate, wherein such opening is configured to provide clearance for the shaft when the plate is in the unlocked position but receives the shaft in locking engagement with the plate when the latter is in the locked position.

Additionally, as another specific objective, it is an important aim of this invention to provide a locking plate as recited in the preceding object wherein locking of the shaft is accomplished by opposed wedge surfaces that move into engagement with the shaft as the plate is shifted to its locked position.

It is also an important object of the present invention to provide an improved tensioning device as aforesaid having a retainer on the wind-up shaft thereof which provides both an eye (or a pair of eyes) for receiving the end of a cable and a slot for receiving a strap in order that either type of tension member may be readily accommodated by the device.

In the drawings:

FIG. 8 is a fragmentary, side elevational view of the device of FIG. 1 showing the same provided with the modified locking plate of FIG. 7;

FIG. 9 is a vertical sectional view taken along line 9—9 of FIG. 8;

FIG. 10 is a view of a second modified form of locking plate;

FIG. 11 is an end view of the device of FIG. 1 showing the same provided with the modified locking plate of FIG. 10;

FIG. 12 is a fragmentary, top plan view of the device shown in FIG. 11;

FIG. 13 is a perspective view of a third modified form of locking plate;

FIG. 14 is a view similar to FIG. 8 showing the device of FIG. 1 provided with the modified locking plate of FIG. 13;

FIG. 15 is a perspective view of a fourth modified form of locking plate;

FIG. 16 is a fragmentary, side elevational view of the device of FIG. 1 showing the same provided with the modified locking plate of FIG. 15;

FIG. 17 is a vertical sectional view taken along line 17—17 of FIG. 16;

FIG. 18 is a side elevational view of another version of the device of the present invention, and also illustrates a strap retained on the wind-up shaft rather than the cable illustrated in FIGS. 1 and 2;

FIG. 19 is a top plan view of the device shown in FIG. 18;

FIG. 20 is a vertical sectional view taken along line 20—20 of FIG. 18 and showing the locking plate in its unlocked position;

FIG. 21 is a view similar to FIG. 20 but showing the locking plate in its locked position;

FIG. 22 is a top plan view identical to FIG. 2 except for the provision of a pair of locking plates of the type illustrated in FIGS. 1–5; and FIG. 23 is a side elevational view of the device shown in FIG. 22.

DETAILED DESCRIPTION — FIGS. 1 - 6

Figure 1:
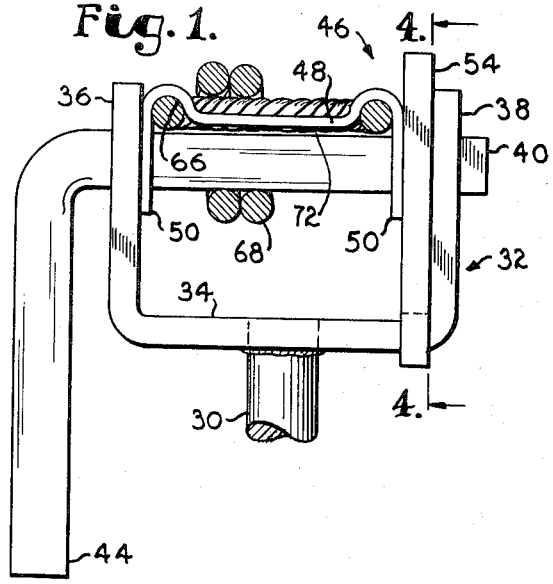
FIG. 1 is a side elevational view of an embodiment of the device of the present invention, showing the same welded to the upper end of the shank of an earth anchor (illustrated fragmentarily)
Figure 2:
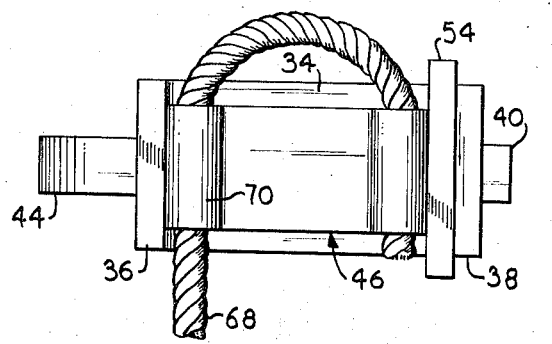
FIG. 2 is a top plan view of the device shown in FIG. 1.
Figure 3:
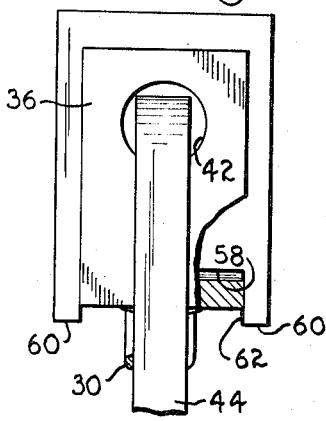
FIG. 3 is an end view of the device shown in FIG. 1.

Referring initially to FIGS. 1–3, the upper end 30 of the shank of an earth anchor serves as a support for a U-shaped bracket or yoke 32, the horizontal base 34 of the yoke being welded to the shank as indicated. Accordingly, the yoke 32 presents a pair of spaced, parallel, upright legs 36 and 38 upon which a wind-up shaft 40 is rotatably mounted. It may be seen in FIG. 3 that each of the legs is provided with a circular opening 42 to present aligned openings for loosely receiving the shaft 40, the latter being of square cross-sectional configuration as is especially apparent in FIGs. 4 and 5. The shaft 40 is operated by a handle 44 integral therewith.

A cable and strap retainer in the nature of a U-shaped retaining element 46 is installed on the shaft 40 between the legs 36 and 38. As is clear in FIG. 6, the retainer element 46 has a flat bight 48 and a pair of opposed wings 50, the latter having aligned, square openings 52 therein. The openings 52 are sized to provide an interference fit with the square shaft 40. Accordingly, in the assembly of the tensioning apparatus of the present invention, the shaft 40 is inserted through the circular, aligned openings 42 in the legs 36 and 38, and the square openings 52 in the wings 50, and thus is held in place and prevented from shifting axially by the interference fit in the openings 52 and the length of the retainer 46, as will be clear from the description to follow and from viewing FIG. 1.

Figure 4:
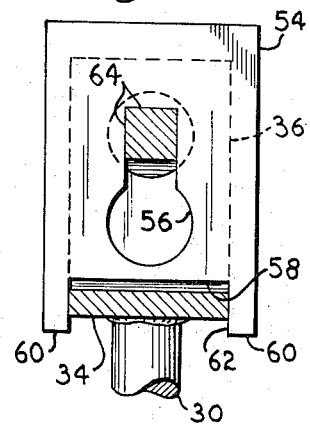
FIG. 4 is a vertical cross-sectional view taken along line 4—4 of FIG. 1 and showing the locking plate in its locked position.

A locking device in the nature of a flat locking plate 54 is interposed between the right wing 50 of the element 46 and the right leg 38, but with sufficient freedom to permit the plate 54 to shift transversely of the axis of the shaft 40. The configuration of th plate 54 is best seen in FIG. 4, where it may be noted that the plate 54 is of elongated, rectangular shape and has a large central opening 56 of keyhole configuration. One end edge 58 of the plate 54 is provided with a pair of spaced feet 60 projecting therefrom and defining a slot 62 between the feet 60 receiving the base 34 when the plate 54 is in its locked position portrayed in FIG. 4. The rectangular portion of the keyhole opening 56 mates with the flats 64 presented by the square shaft 40 to lock the shaft against rotation when the plate 54 is in the locked position.

Figure 6:
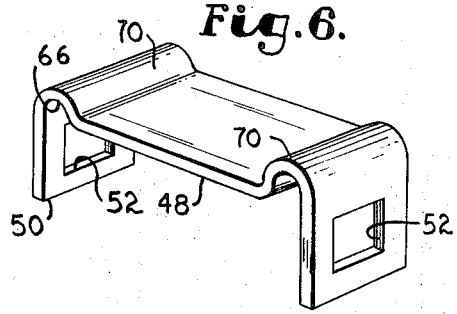
FIG. 6 is an enlarged, perspective view of the cable/strap retainer removed from the wind-up shaft.

Referring again to the retainer element 46 and paraticularly FIGS. 1, 2 and 6, it may be seen that the element 46 is of one piece, metal construction and is specially shaped to provide a pair of eyes 66 through which a cable 68 may be threaded in order to secure the end of the cable 68 to the shaft 40 prior to the tensioning operation. In this regard, it may be noted that the opposed end portions of the bight 48 are bent back at 70 out of the major plane of the bight 48 and thereupon merging with the respective wings 50 to form the eyes 66. As will be discussed hereinafter with respect to FIGS. 18–21, the bight 48 also forms a slot 72 between the inside surface of the bight 48 and the adjacent flat 64 of the shaft 40. This is for the purpose of retaining a strap on the shaft 40 in lieu of the illustrated cable 68.

Figure 5:
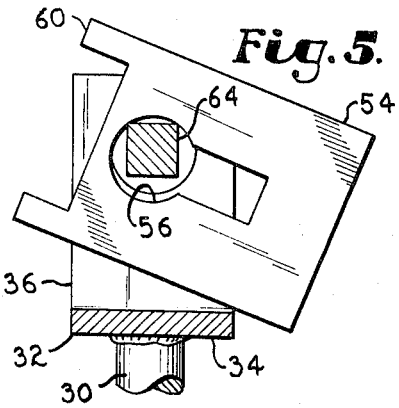
FIG. 5 is a view similar to FIG. 4 but showing the locking plate in its unlocked position.

The unlocked position of the locking plate 54 is illustrated in FIG. 5. The circular portion of the keyhole opening 56 provides clearance for the shaft flats 64 when the plate 54 is displaced transversely of the shaft 40 a sufficient distance to efectively withdraw the flats from the rectangular portion of the opening 56. In the unlocked position the plate 54 may simply be rotated until one of its longitudinal edges rests on the base 34 of the yoke 32 as illustrated, thereby permitting the shaft 40 to rotate freely.

MODIFIED LOCKING PLATES — FIGS. 7 - 17

In the detailed description to follow under this heading, it should be understood that the components of the tensioning apparatus described above and illustrated in FIGS. 1–6 are unchanged except for the particular means utilized to lock the shaft 40 against rotation. Accordingly, such components will be identified by the same reference numerals as used hereinabove.

Figure 7:
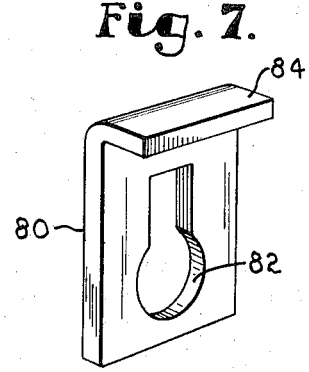
FIG. 7 is a perspective view of a modified form of locking plate.

In FIGS. 7–9 an L-shaped locking plate 80 is illustrated having an opening 82 therein of keyhole configuration. The L-shaped plate 80 presents a lip 84 which projects over the upper end of the leg 38 when the plate 80 is in its locked position depicted in FIGS. 8 and 9. Note that in this modified form of locking device the interengagement between the locking plate 80 and the yoke 32 is accomplished at the free end of the leg 38 by virtue of interference with the projecting lip 84. The unlocked position of the plate 80 is analogous to that as shown in FIG. 5 for the plate 54.

In FIGS. 10–12 a locking plate 90 of generally C-shaped configuration has a flat, major part 92 provided with a keyhole opening 94. The plate 90 presents a pair of opposed wings 96 that embrace corresponding longitudinal edges of the leg 38 of the yoke 32, the tolerances being such as to permit the plate 90 to slide freely on the leg 38 in reciprocal fashion. The plate 90 is shown in FIG. 11 in its lowermost position on the leg 38 with the rectangular portion of the keyhole opening 94 receiving the flats 64 of the shaft 40. This is the locked position of the plate 90, unlocking of the shaft 40 being accomplished by raising the plate by a sliding action along the leg 38 until the flats 64 are effectively withdrawn and are freely received within the circular clearance opening portion of the keyhole opening 94.

Another modified form of locking device is shown in FIGS. 13 and 14. An L-shaped locking plate 100 has an overall configuration similar to the locking plate 80 of FIGS. 7–9. The L-shaped plate 100 presents a lip 102 that projects over the free end of the leg 38 to lock the shaft against the yoke as in FIGS. 8 and 9. However, the flat, major plate portion of the locking plate 100 is provided with a generally oval opening 104 rather than a keyhole opening as in the previous forms of the invention. The internal edges of the plate thus formed by the sides of the opening 104 present opposed wedge surfaces 106 which converge toward the smaller (upper in FIGS. 13 and 14) end of the opening 104. The wedge surfaces 106 are serrated to present rows of teeth to assist in gripping the shaft 40 when the plate 100 is in the locked position thereof illustrated in FIG. 14. It should be understood that the locking action in this form of the invention may be accomplished without providing the wind-up shaft 40 with a polygonal cross-sectional configuration, inasmuch as the converging rows of teeth presented by the wedge surfaces 106 may be forcibly brought into engagement with a round shaft (not shown) to grip the same and provide the desired locking action.

In FIGS. 15–17 a fourth modification is illustrated, and comprises a sliding, rectangular locking plate 110 having an elongated, centrally disposed slot 112 therein located on the longitudinal axis of the plate. The plate 110 is mounted on the leg 38 of yoke 32 by a pin 114 extending through the leg 38 and the slot 112. As is clear from a comparison of FIGS. 16 and 17, the enlarged head of the pin 114 positively retains the plate 110 against the inside surface of the leg 38. The normally lowermost end of the plate 110 has a rectangular opening 116 therein communicating with the edge of the plate to form an open slot capable of receiving the flats 64 of the shaft 40 as illustrated in FIG. 17. This is the locked position of the plate 110, it being understood that the shaft is unlocked by sliding the plate upwardly until the flats 64 are disengaged as is permited by the pin and slot interconnection with the leg 38.

An alternative configuration for the plate 110 is illustrated by broken lines in FIGS. 15 and 17. The broken line configuration imparts an L-shape to the plate 110 similar to that previously illustrated in FIGS. 7–9. Accordingly, the lip 118 thus formed overlies the free end of the leg 38 when the plate 110 is in its locked position to reinforce the locking action.

DUAL LOCKING PLATES — FIGS. 22 AND 23

The employment of two locking plates for applications requiring high resistance to mechanical stress is illustrated in FIGS. 22 and 23. This version of the device of the present invention is identical to the tensioning apparatus disclosed in FIGS. 1–6, except that a pair of locking plates 54a and 54b are utilized instead of the single locking plate 54. The retainer element 46 is shorter in length relative to the spacing between the legs 36 and 38 as compared with the structure illustrated in FIGS. 1–6. This is for the purpose of accommodating both of the locking plates 54a and 54b between respective ends of the element 46 and the adjacent legs 36 and 38. The configuration of each of the plates 54a and 54b is identical to plate 54, and the locked and unlocked positions thereof relative to the shaft 40 are as illustrated in FIGS. 4 and 5.

DETAILED DESCRIPTION — FIGS. 18 – 21

The embodiment of FIGS. 18–21 is again identical to the previously described versions of the invention except for the nature of the locking device employed to hold the wind-up shaft 40 against rotation. For purposes of illustration, the retaining element 46 is shown securing the end of a flexible strap 200 to the shaft 40, the strap 200 being initially received within the slot 72 provided between the bight 48 and the shaft 40 as previously described.

The locking device in FIGS. 18–21 is in the nature of a flat, rectangular, elongated locking plate 202 having a keyhole opening 204 approximately centered therein. However, the opening 204 is reversed as compared with the keyhole locking plates described hereinabove, and the plate 202 is proportionally longer. Note the unlocked position of the plate 202 shown in FIG. 20, where it may be seen that one of the end edges 206 of the plate 202 is resting on the base 34 of the yoke 32 with the axis of the shaft 40 coaxial with the circular portion of the keyhole opening 204. Accordingly, in this upright position the plate 202 and the shaft 40 are in clearing relationship and the shaft is free to rotate without interference from the plate 202.

The locking position of the plate 202 is illustrated in FIG. 21. One of the longitudinal edges 207 of the plate 202 is now in engagement with the edge of the base 34, ane the flats 64 of the shaft 40 are now received within the mating rectangular slot of the keyhole opening 204. Accordingly, the shaft is locked against rotation in a clockwise direction as viewed in FIG. 21. It may likewise be locked against counterclockwise rotation by engagement of the opposite longitudinal edge 208 of the plate 202 against the other side of the base 34.

OPERATION (All Forms)

The end of the cable 68 is threaded through one of the eyes 66 and then doubled back through the other eye as best illustrated in FIG. 2. If desired, the retainer element 46 may be formed with one eye 66 only, but two eyes are preferred. Alternatively, if a strap member is to be tensioned, the end thereof is received by the slot 72 as illustrated for the strap 200 shown in FIGS. 18 and 19. It should be understood that ropes, chains, wires and other elongate flexible members may be employed.

As is evident, tensioning is effected by grasping the handle 44 and rotating the same to wind the flexible member about the shaft 40. Once the desired tension is reached, the locking plate is actuated to hold the shaft 40 against rotation under the pull of the now tensioned member. In the embodiment of the invention shown in FIGS. 1–5 and the dual plate version of FIGS. 22 and 23, the operation of the locking plate 54 (and 54a and 54b) to lock the shaft 40 is evident from a comparison of FIGS. 5 and 4. Note that the base 34 of the yoke 32 is captured in the slot 62 when the plate 54 is in its locked position; thus a positive lock is provided that prevents rotation of the shaft in either direction.

The locking action provided by the modified locking plates 80 and 90 is quite similar to that as just described for plate 54, inasmuch as the locking plate is held by the body of the yoke 32 while the flats 64 of the shaft 40 are simultaneously held by the mating rectangular portion of the keyhole opening. The manner of interengagement of each form of plate with the yoke is different, as such engagement is accomplished at the free end of the leg 38 in FIGS. 8 and 9 and along the opposed longitudinal margins of the leg 38 in FIGS. 11 and 12. Either form, however, provides a strong mechanical lock and utilizes the body of the yoke to hold the shaft 40 against rotation.

As far as the engagement with the yoke 32 is concerned, the action of the locking plate 100 in FIGs. 13 and 14 is the same as the plate 80, but in this version of the invention the shaft 40 is held by the opposed wedge surfaces 106 rather than by a mating rectangular slot. The advantage in this form of the invention lies in its application to round shafts as well as those of polygonal cross-sectional configuration, particularly in instances where the mechanical load placed on the shaft by the tensioned member is not as high as in applications where a locking plate of the keyhole type would be utilized.

The locking action obtained by the locking plate 110 of FIGS. 15–17 is also similar to that as previously described, particularly in the case of the modification shown in broken lines employing the lip 118.

Referring to FIGS. 18–21, the manner in which the locking plate 202 functions is somewhat different in that the plate is not in an upright position when locked. As in the previous forms of the invention, however, the plate 202 is shifted transversely of the shaft 40 between its locked and unlocked positions and, as in FIGS. 1–14, 22 and 23, the shaft 40 is at all times received within the opening 204 in the plate 202. However, as is clear in FIG. 20, when the shaft 40 is in clearing relationship to the plate 202 within the circular portion of the opening 204, the plate 202 is upright and supported on the base 34 of the yoke 32. This provides an advantage in that the plate is positively held in the unlocked position against inadvertent movement transversely of the shaft into a locked attitude. It may be appreciated from viewing FIG. 21 that a positive lock is obtained when the plate 202 is shifted to mate the rectangular portion of the opening 204 with the flats 64, inasmuch as the entire body of the plate 202 is held in forcible engagement with the base 34 by the tension of the cable or strap wound on the shaft 40.

It is to be understood that the term "keyhole configuration" in the appended claims and as used in the foregoing specification is not to be construed as denoting solely a circular opening communicating with a rectangular opening, but is to be interpreted as a term denoting a dual function, i.e., that of clearing the wind-up shaft when the locking plate is in one position, and that of engaging the flats of the shaft when the locking plate is in a second position to lock the shaft and the plate against relative movement.

Referring to the member 46 in the various views, while it is shown as having a pair of rectangular or square openings 52 in the wings or legs 50 thereof, it should be understood that member 46 may be welded, pinned or riveted onto the shaft 40 after same is passed through the openings in legs 36 and 38. Thus it is not necessary to slide member 46 on shaft 40.

It is further evident that shaft 40 may be of hexagonal or other polygonal configuration so long as there are flat surfaces thereon to be engaged by the flat surface portions of the "keyhole." The device of FIGS. 13 and 14 is somewhat of an exception to this statement and operates as previously described.

While the shaft 40 and handle 44 are shown in the various views as integral and L-configuration, it is understood that handle 44 may be omitted and a wrench or tool employed to rotate shaft 40. Member 46 may also be retained on shaft 40 by distorting (from the right angle configuration shown) legs 50 whereby to bind in the manner of a Tinnerman Nut on a stud.

From the foregoing, it will be seen that this invention in one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described the invention, what is claimed as new and desired to be secured by Letters Patent is:

1. In a tensioning apparatus where a rotatable wind-up shaft is supported by the spaced legs of a yoke and is rotated to wind a flexible cable or strap around the shaft, means between said legs for retaining the cable or strap on the shaft comprising a generally U-shaped element rotatable with the shaft and having a bight and a pair of opposed wings, said wings having aligned openings therein receiving said shaft with the bight extending longitudinally of the shaft in spaced relationship thereto to define a slot between the bight and the shaft for receiving said strap, said bight having an eye for receiving said cable threaded through the eye transversely of the shaft, whereby said retaining means accommodates either said cable or said strap.

2. In the apparatus as claimed in claim 1, wherein said element is of one-piece construction, said bight being bent back away from said shaft adjacent one of said wings and merging with said one wing to present said cable-receiving eye.

3. In the apparatus as claimed in claim 1, wherein said bight has a pair of said eyes adjacent corresponding wings for doubling said cable back through one of the eyes after threading the cable initially through the other eye.

4. Tensioning apparatus comprising:
a mounting yoke having a pair of spaced legs;
a rotatable wind-up shaft carried by said legs and having means between said legs for retaining a flexible member on the shaft to be held under tension by the apparatus,
said means for retaining said flexible member on the shaft comprising a generally U-shaped element rotatable with the shaft and having a bight and a pair of opposed wings,
said wings having aligned openings therein receiving said shaft with the bight extending longitudinally of the shaft in spaced relationship thereto to define a slot between the bight and the shaft for receiving a flexible strap,
said bight having at least one eye for receiving a cable threaded through the eye transversely of the shaft, whereby said flexible member in the form of either said strap or said cable is accommodated by said retaining means,
a locking plate received between the legs of said yoke and having a configured opening therethrough receiving the shaft in alternate releasing and locking engagement with itself,
the locking palte additionally closely but slideably received between one of the legs of the yoke and one of the wings of the retainer means,
said opening being of key-hole configuration to clear said shaft when the locking plate is in its unlocked position and engage said shaft when the plate is in its locked position, said locking plate being slideably shiftable transversely of said shaft between a release position where the locking plate is disengaged from the shaft, and a locked position where the shaft is received in said configured opening in locking engagement with said locking plate, said locking plate having means cooperating with said yoke to hold the device against rotation with the shaft when the locking plate is in its locked position, whereby to lock the shaft against rotation under the tension of the member wound thereupon.

5. A device as in claim 4 wherein the opening in the locking plate is so configured as to define a pair of opposed wedged surfaces movable into engagement with said shaft as the plate is shifted to its locked position.

6. The device of claim 5 wherein said surfaces are serrated to present a plurality of teeth engageable with said shaft.

7. A device as in claim 4 wherein the locking plate has the edges thereof configured to slideably grasp the edges of the adjacent yoke leg.

8. A device as in claim 4 wherein said bight of said retaining means has a pair of said eyes, one of same adjacent each wing for doubling a cable back through one of the eyes after threading the cable initially through the other eye.

9. A device as in claim 4 wherein at least the portion of the shaft extending through the opening in the locking plate is of polygonal cross-sectional configuration to present a plurality of flats, the opening in the locking plate being of such keyhole configuration as to provide the clearance for the shaft when the plate is in its release position, and said opening having a portion mating with said flats when the plate is in its locked position.

10. A device as in claim 4 wherein the yoke has a base from which said legs extend, the locking plate having an edge provided with a pair of spaced feet projecting therefrom and defining a slot between the feet receiving said base when the plate is in its locked position, whereby the plate is held against said rotation with the shaft to effect said locking thereof.

11. A device as in claim 10, wherein said device includes a pair of said locking plates adjacent respective legs of said yoke.

12. A device as in claim 4 wherein said device includes a pair of said locking plates adjacent respective legs of said yoke, each between one of said yoke legs and one of said retaining member wings.

13. A device as in claim 4 wherein said locking plate is of generally L-shaped configuration and projects over one of said legs in engagement therewith when the plate is in its locked position.

14. A device as in claim 4 wherein said locking plate is provided with a major part thereof having said shaft receiving opening therein, and a pair of spaced wings projecting from said major part and at least partially embracing one of said yoke legs, whereby, when the plate is in its locked position, the plate is held against rotation with the shaft by interference with said one leg.

15. A device as in claim 4 wherein said yoke has a base from which said legs extend, said plate being elongated and presenting a pair of opposed longitudinal edges, one of said edges being brought into engagement with said base as said shaft is angularly displaced with the plate in its locked position, whereby the plate is held against rotation with the shaft to effect said locking thereof.

* * * * *